US011689450B2

United States Patent
Pereira et al.

(10) Patent No.: US 11,689,450 B2
(45) Date of Patent: *Jun. 27, 2023

(54) ROUTING APPLICATION CALLS (71) Applicant: SAP SE, Walldorf (DE)

(72) Inventors: Bolivar Santos Perez Pereira, Porto Alegre (BR); David Briemann, Heidelberg (DE)

(73) Assignee: SAP SE, Walldorf (DE)

( * ) Notice: Subject to any disclaimer, the term of this patent is extended or adjusted under 35 U.S.C. 154(b) by 21 days.

This patent is subject to a terminal disclaimer.

(21) Appl. No.: 17/544,494

(22) Filed: Dec. 7, 2021

(65) Prior Publication Data

US 2022/0150161 A1 May 12, 2022

Related U.S. Application Data (63) Continuation of application No. 17/096,478, filed on Nov. 12, 2020, now Pat. No. 11,196,665.

(51) Int. Cl.
| | |
|---|---|
| G06F 15/16 | (2006.01) |
| H04L 45/302 | (2022.01) |
| H04L 45/52 | (2022.01) |
| G06F 9/54 | (2006.01) |
| H04L 61/45 | (2022.01) |
| H04L 61/4511 | (2022.01) |
| H04L 61/5007 | (2022.01) |

(Continued)

(52) U.S. Cl.
CPC ............ *H04L 45/306* (2013.01); *G06F 9/547* (2013.01); *H04L 45/52* (2013.01); *H04L 61/457* (2022.05); *H04L 61/4511* (2022.05); *H04L 61/5007* (2022.05); *H04L 67/561* (2022.05); *H04L 67/63* (2022.05); *H04L 63/0281* (2013.01); *H04L 63/166* (2013.01)

(58) Field of Classification Search
CPC ........................... H04L 45/306; H04L 61/1511
See application file for complete search history.

(56) References Cited

U.S. PATENT DOCUMENTS

| | | |
|---|---|---|
| 7,673,336 B2 | 3/2010 | Alse et al. |
| 9,086,932 B2 | 7/2015 | Guertler et al. |

(Continued)

OTHER PUBLICATIONS

Ahmed, M., "Kubernetes Patterns : The Service Discovery Pattern," retrieved from the Internet at https://www.magalix.com/blog/kubernetes-patterns-the-service-discovery-pattern, 22 pages, published Oct. 21, 2019.

(Continued)

*Primary Examiner* — Hieu T Hoang
(74) *Attorney, Agent, or Firm* — Sterne, Kessler, Goldstein & Fox P.L.L.C.

(57) ABSTRACT

Disclosed herein are system, method, and computer program product embodiments for routing communication to applications. In an embodiment, first application can transmit a connection to a second application without knowing the exact route address of the second application. An agent can intercept the connection from a first application intended for a second application. The agent can identify the route address for the second application, determine the protocol the connection was intended to be transmitted, and forward the connection based on the route address and protocol to the second application.

20 Claims, 7 Drawing Sheets

(51) Int. Cl.
*H04L 67/63* (2022.01)
*H04L 67/561* (2022.01)
*H04L 9/40* (2022.01)

(56) References Cited

U.S. PATENT DOCUMENTS

| | | | |
|---|---|---|---|
| 10,104,152 B2 | 10/2018 | Borrowman et al. | |
| 10,218,633 B2 | 2/2019 | Carl | |
| 10,432,452 B2 | 10/2019 | Aliminati | |
| 10,496,987 B2 | 12/2019 | Zhang | |
| 10,972,503 B1 | 4/2021 | Mohan | |
| 10,992,575 B2 | 4/2021 | Kelam | |
| 11,075,792 B2 | 7/2021 | Deshmukh | |
| 11,196,665 B1 | 12/2021 | Pereira et al. | |
| 2002/0010787 A1* | 1/2002 | Masuda | H04L 43/18 709/236 |
| 2009/0276771 A1 | 11/2009 | Nickolov | |
| 2011/0029988 A1 | 2/2011 | Mittal et al. | |
| 2011/0088046 A1 | 4/2011 | Guertler et al. | |
| 2012/0102192 A1 | 4/2012 | Takeshima | |
| 2012/0317254 A1 | 12/2012 | Chekhanovskiy | |
| 2015/0215268 A1 | 7/2015 | Dinha | |
| 2016/0156629 A1* | 6/2016 | Yasaki | G06F 13/102 726/4 |
| 2016/0205106 A1* | 7/2016 | Yacoub | H04W 12/041 726/28 |
| 2016/0359955 A1 | 12/2016 | Gill | |
| 2018/0150356 A1 | 5/2018 | Boshev et al. | |
| 2019/0007366 A1 | 1/2019 | Voegele | |
| 2019/0356693 A1 | 11/2019 | Cahana | |
| 2020/0036796 A1* | 1/2020 | Tollet | H04L 12/4633 |
| 2020/0099610 A1* | 3/2020 | Heron | H04L 61/256 |
| 2020/0112487 A1 | 4/2020 | Inamdar | |
| 2020/0137185 A1 | 4/2020 | Parekh | |
| 2020/0192690 A1* | 6/2020 | Gupta | G06F 9/5077 |
| 2020/0250006 A1* | 8/2020 | Parekh | H04L 67/1008 |
| 2020/0278892 A1 | 9/2020 | Nainar | |
| 2021/0011816 A1* | 1/2021 | Mitkar | G06F 11/3006 |
| 2021/0019194 A1 | 1/2021 | Bahl | |
| 2021/0135957 A1 | 5/2021 | Thakkar | |
| 2021/0203542 A1 | 7/2021 | Deshmukh | |

OTHER PUBLICATIONS

Boucheron, B., "An Introduction to the Kubernetes DNS Service," retrieved from the Internet at https://www.digitalocean.com/community/tutorials/an-introduction-to-the-kubernetes-dns-service, 10 pages, posted Oct. 19, 2018.

"Configuring Routes and Domains," retrieved from the Internet at https://docs.cloudfoundry.org/devguide/deploy-apps/routes-domains.html#create-route, 12 pages, last updated: Sep. 2, 2020.

"Container-to-Container Networking," retrieved from the Internet at https://docs.cloudfoundry.org/concepts/understand-cf-networking.html, 4 pages, last updated: Sep. 2, 2020.

Lee, J., "Red Hat OpenShift Container Platform DNS deep dive: DNS changes in Red Hat OpenShift Container Platform 3.6," retrieved from the Internet at https://www.redhat.com/en/blog/red-hat-openshift-container-platform-dns-deep-dive-dns-changes-red-hat-openshift-container-platform-36, 12 pages, Dec. 13, 2017.

Zeltser, Z., "SAP Application Router," retrieved from the Internet at https://blogs.sap.com/2020/04/03/sap-application-router/, 44 pages, Apr. 3, 2020.

Configuring Routes and Domains—Cloud Foundry Docs, Sep. 2020, all pages (Year: 2020).

* cited by examiner

ROUTING APPLICATION CALLS

CROSS-REFERENCE TO RELATED APPLICATIONS

This is a Continuation Application of U.S. Utility application Ser. No. 17/096,478 filed Nov. 12, 2020, the contents of which are incorporated herein by reference in their entirety.

BACKGROUND

A virtual system (vSystem) can host multiple different applications that communicate with one another. The vSystem applications (or workloads) can communicate with one another using various protocols. Each protocol can correspond to a different and unique route address. However, it can be burdensome for each application to know the route address for each protocol of the other applications. Moreover, conventional systems can implement restrictions on applications with one another using a single protocol. This can cause bottlenecks at a destination port of a given application receiving network traffic from other applications.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for identifying and loading a relevant page of a dictionary into temporary memory.

As described above, applications in virtual systems (i.e., vSystem) communicate with one another. Each application can support multiple communication protocols. Each protocol supported by the application can correspond with a different port, and each port can have a unique route address. A given application cannot know the specific route address for each port supported by a different application. Furthermore, the given application may need to communicate with the different application using a specific protocol. For example, if the given application needs to communicate with the different application using TCP, the given application would not be able to communicate with the different application using an HTTP-specific proxy. The method, system, and non-transitory computer-readable medium embodiments described herein solve this problem by routing communication to an application's desired destination port, irrespective of the protocol.

In an embodiment, an agent domain name system (DNS) server can receive from a first application a query to a second application. The query can include a domain address of the second application. The agent DNS server can assign an unused internet protocol (IP) address to the second application. The agent DNS server can add the IP address assigned to the second application and the second application's domain address to a lookup table. The agent DNS server can transmit the IP address to the first application. The first application can transmit a call to the second application using the IP address. An agent egress server can intercept the call to the second application based on the IP address. The agent egress server can retrieve the second address's domain address from the lookup table using the IP address assigned to the second application and identify an identifier of the second application from the domain address. Furthermore, the agent egress server can identify a route address for the second application using a metadata service configured to store routes of applications. The agent egress server can forward the call to the second application using the route.

This configuration allows for applications to communicate with other applications without keeping track of each route address for each destination port of the other applications. By doing so, this configuration allows applications to support multiple different protocols so that bottlenecks at a given communications port can be avoided. Furthermore, this empowers the applications to communicate with different applications by transparently specifying the identifier of the application they are targeting.

Moreover, by using a metadata service to retrieve route addresses and any metadata needed to communicate with applications, applications do not need to send requests to a central service to be proxied to another application. This avoids any bottlenecks resulting from using a shared proxy for all applications (or workloads). Moreover, this allows for higher performance on routing between cluster entities as fewer requests/hops are present in the communication flow.

Figure 1:
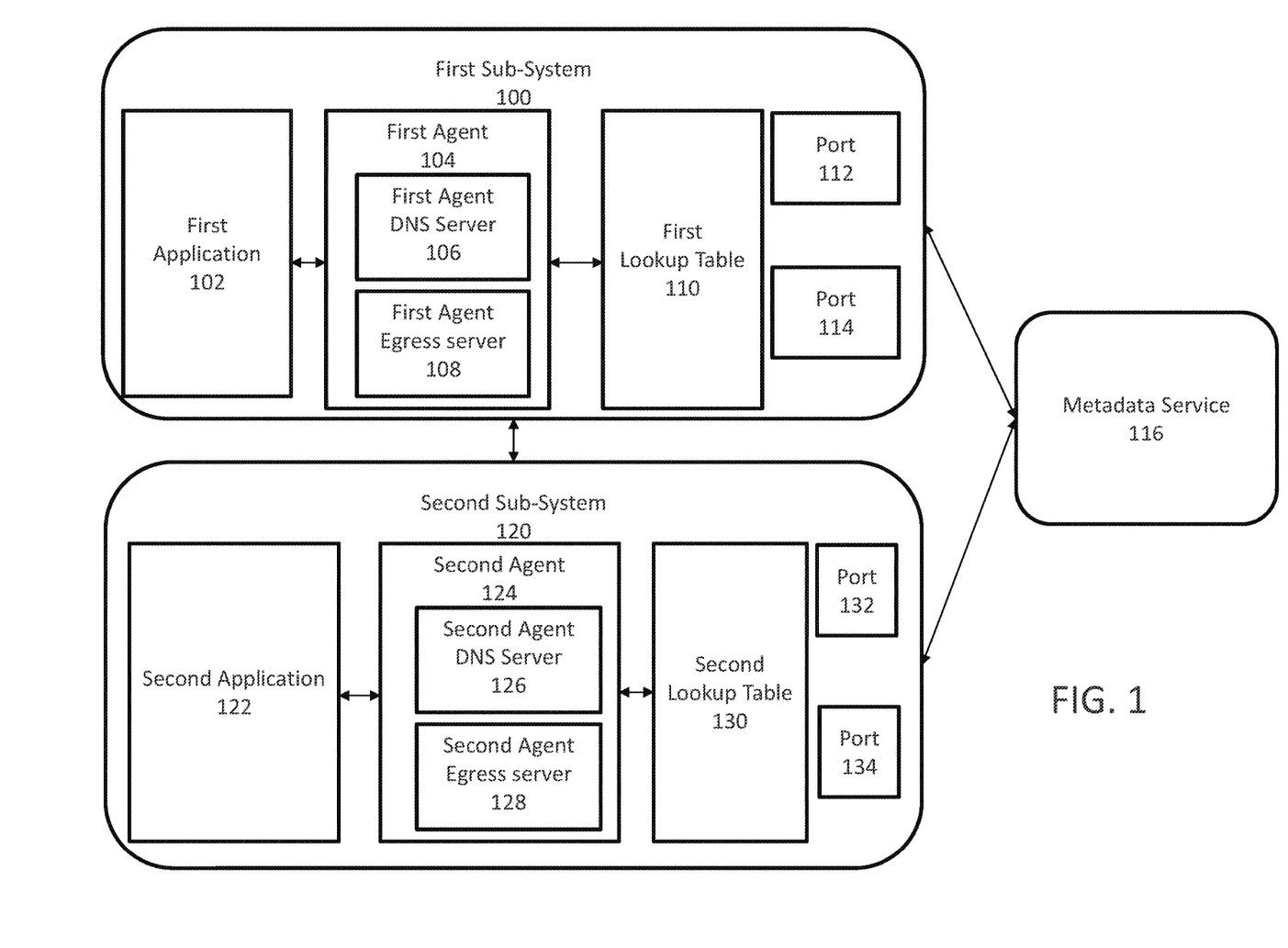
FIG. 1 is a block diagram of a system for routing application calls, according to some embodiments.

FIG. 1 is a block diagram of a system for routing application calls, according to some embodiments. In an embodiment, the architecture can include a first sub-system 100 and a second sub-system 120. First sub-system 100 can include a first application 102, first agent 104, first lookup table 110, port 112, and port 114. First agent 104 can include first agent DNS server 106 and first agent egress server 108. Second sub-system 120 can include a second application 122, second agent 124, second lookup table 128, port 130, and port 132. First sub-system 100 can be in communication with second sub-system 120. First sub-system 100 and second sub-system 120 can be in communication with metadata service 116. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

First sub-system 100 and second sub-system 120 can be a collection of computing resources such as servers, routers, workstations, etc. Furthermore, first sub-system 100 and second sub-system 120 can be part of a virtual system (i.e., vSystem). First sub-system 100 and second sub-system 120 can be configured to execute a single instance of first application 102 and second application 122, respectively. As a non-limiting example, first sub-system 100 and second sub-system 120 can be Kubernetes pods.

First agent 104 and second agent 124 can be application (e.g., sidecar) containers that support the operation of first application 102 and second application 124. More specifically, first agent 104 and second agent 124 can be configured to provide monitoring, logging, configuration, and networking services. For example, as indicated above, first agent 104 can include first agent DNS server 106 and first agent egress server 108. Furthermore, second agent 124 can include second agent DNS server 126 and second egress server 128. First agent DNS server 106, first agent egress server 108, second agent DNS server 126, and second agent egress server 128 can provide networking services.

First agent DNS server 106 and second agent DNS server 126 can be configured to match and assign IP addresses with/to domain addresses for services or applications. First agent egress server 128 and second agent egress server 128 can be configured monitor egress traffic directed to be transmitted outside the respective sub-system. Egress traffic can be network traffic originating within a network, and its destination is outside the network. For example, first agent egress server 128 and second agent egress server 128 is configured to intercept application calls based on IP addresses included in the application calls. Moreover, first agent egress server 108 can be configured to route traffic/application calls to applications. Metadata service 116 can be a service that is configured to store the routes of applications (e.g., applications within a pod).

First application 102 and second application 104 can support multiple different communications protocols (e.g., HTTP or TCP). First application 102 and second application 102 can receive network traffic at destination ports such as ports 112-114 and ports 132-134. Each port can support a different communication protocol. For example, port 112 and port 114 can support different communications protocols, respectively. Likewise, port 132 and 134 can support different communications protocols, respectively. Furthermore, each of ports 112-114 and ports 132-134 can have unique and distinct route addresses.

As a non-limiting example, port 112 and 132 can support HTTP communication, while port 114 and 134 can support TCP communication. Therefore, ports 112 and 132 can serve an HTTP API, and port 114 and 134 can support a TCI endpoint. This allows first application 102 and second application 122 to receive communication from web-clients (e.g., HTTP communication) and TCP/IP clients.

First lookup table 110 and second lookup table 130 can reside in data repositories. The first lookup table 110 and second lookup table 130 can include IP addresses and domain addresses of applications. The IP addresses can be bogus IP addresses assigned to applications. For example, each time first agent DNS server 106 or second agent DNS server 126 assigns an IP address to an application, first agent DNS server 106 or second agent DNS server 126 can store the IP address and domain address of the application in first lookup table 110 and second lookup table 130, respectively. First agent egress server 108 and second agent egress server 128 can use first lookup table 110 and second lookup table 130, respectively, to retrieve a domain address using an application's IP address. This allows first agent egress server 108 and second agent egress server 128 to identify the name (or identifier) of the application from the domain address and route traffic or an application call to the application.

Figure 2:
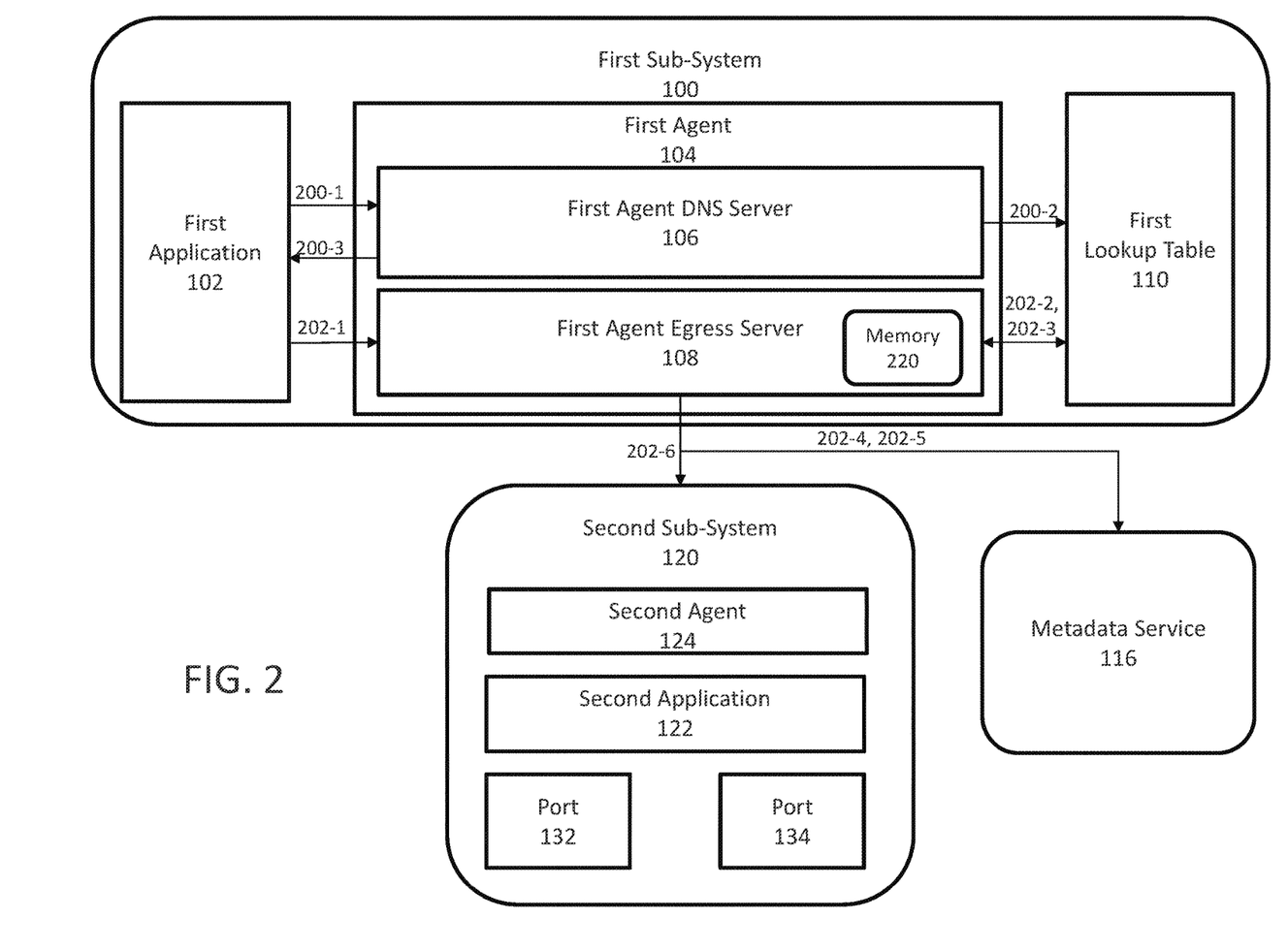
FIG. 2 is a block diagram illustrating an example data flow in the system for routing application calls, according to some embodiments.

FIG. 2 is a block diagram illustrating the data flow in the system for routing application calls, according to some embodiments. In a given embodiment, first application 102 transmits a query 200-1 to first agent DNS server 106 to retrieve an IP address corresponding to the domain address of second application 122. First application 102 can attempt to connect with second application 122 using the IP address. Query 200-1 can include a domain address of second application 122. For example, the domain address of second application 122 can be echo-app.secondapplication.tcp.v-system-agent.pod.local. The domain address can also include a port number. The port number can be the desired destination port (e.g., port 132 or 134) of second application 122. The port number can also indicate the desired communications protocol. For example, port number 8080 can correspond with an HTTP API, and port number 8081 can correspond with a TCP endpoint.

First agent DNS server 106 can receive query 200-1 and can determine that the domain address is for second application 122 based on an identifier of second application 122 included in the domain address. In this example, the identifier can be the name (e.g., "second application") of second application 122. First agent DNS server 106 can determine that an IP address has not been assigned to second application 122. Therefore, DNS server 106 can assign a "bogus" IP address to the second application's domain address 122. The "bogus" IP address can be within a predetermined block of IP addresses directed to documentation and are not valid public internet IP addresses. The "bogus" IP is meant to signify that first application 102 is attempting to communicate with second application 122. As a non-limiting example, the block of IP addresses can be 192.0.2.0/24 (TEST-NET-1). All 256 addresses inside this block internally can be used as "bogus" IP addresses.

First agent DNS server 106 can transmit a request 200-2 to first lookup table 110 to store the newly assigned "bogus" IP address and domain address (including the port number) of second application 122 in lookup table 132. First lookup table 110 can maintain and store the domain addresses of various applications and the corresponding "bogus" IP addresses assigned to the domain addresses. First agent DNS server 106 can transmit the newly assigned "bogus" IP address to first application 102 in response 200-3.

First application 102 can transmit a call 202-1 to second application 122 using the newly assigned "bogus" IP address and the port number. Call 202-1 can include the "bogus" IP address, port number, and a request for second application 122 to process. Furthermore, call 202-1 can include a request to form a connection with second application 122. First agent egress server 108 can be configured to detect any attempts to form a connection with an IP address from the block of IP addresses. Therefore, first agent egress server 108 can detect that first application 102 is attempting to form a connection with the newly assigned "bogus" IP address. First agent egress server 108 can intercept call 202-1.

First agent egress server 108 can transmit a query 202-2 to first lookup table 110 to retrieve the domain address of second application 122 from lookup table 132 using the "bogus" IP address and port number, included in call 202-1. First lookup table 110 can return the domain address of second application 122 in response 202-3. Agent egress server 112 can determine that call 202-1 was directed to second application 122 based on the identifier (e.g., name) of second application 122 in the domain address.

First agent egress server 108 can transmit a query 202-4 to metadata service 116 to determine a route address for second application 122. Query 202-4 can include the identifier of second application 122. Metadata service 116 can be configured to store routes for various applications. The route can be an address of a destination port of a second application 122 within the vSystem. Metadata service 116 can return the route in response 202-5 to first agent egress server 108. In some embodiments, metadata service 116 can periodically transmit route addresses of various applications to first agent egress server 108. First agent egress server 108 can store the routes in memory 220. This way, first agent egress server 108 can retrieve the route from memory 220 instead of querying metadata service 116.

First agent egress server 108 can build a route proxy using the route for second application 122 and the port number. In some embodiments, first agent egress server 108 can build the route proxy using mutual transport layer security (mTLS). First agent egress server 108 can determine the desired destination port and communications protocol based on the port number. First agent egress server 108 can forward connection 202-6 between first application 102 and the "bogus" IP address to the desired port of second application 122 using the route proxy. Connection 202-6 can include the request included in the call 202-1. Furthermore, connection 202-6 can be forwarded as the desired communications protocol corresponding to the desired port.

Second agent 124 can receive and accept connection 202-6, including call 202-1. Second agent 124 can parse call 202-1 to extract the request or data to be transmitted to second application 122 from first application 120. Second agent 124 can forward the request or data to second application 122.

Figure 3:
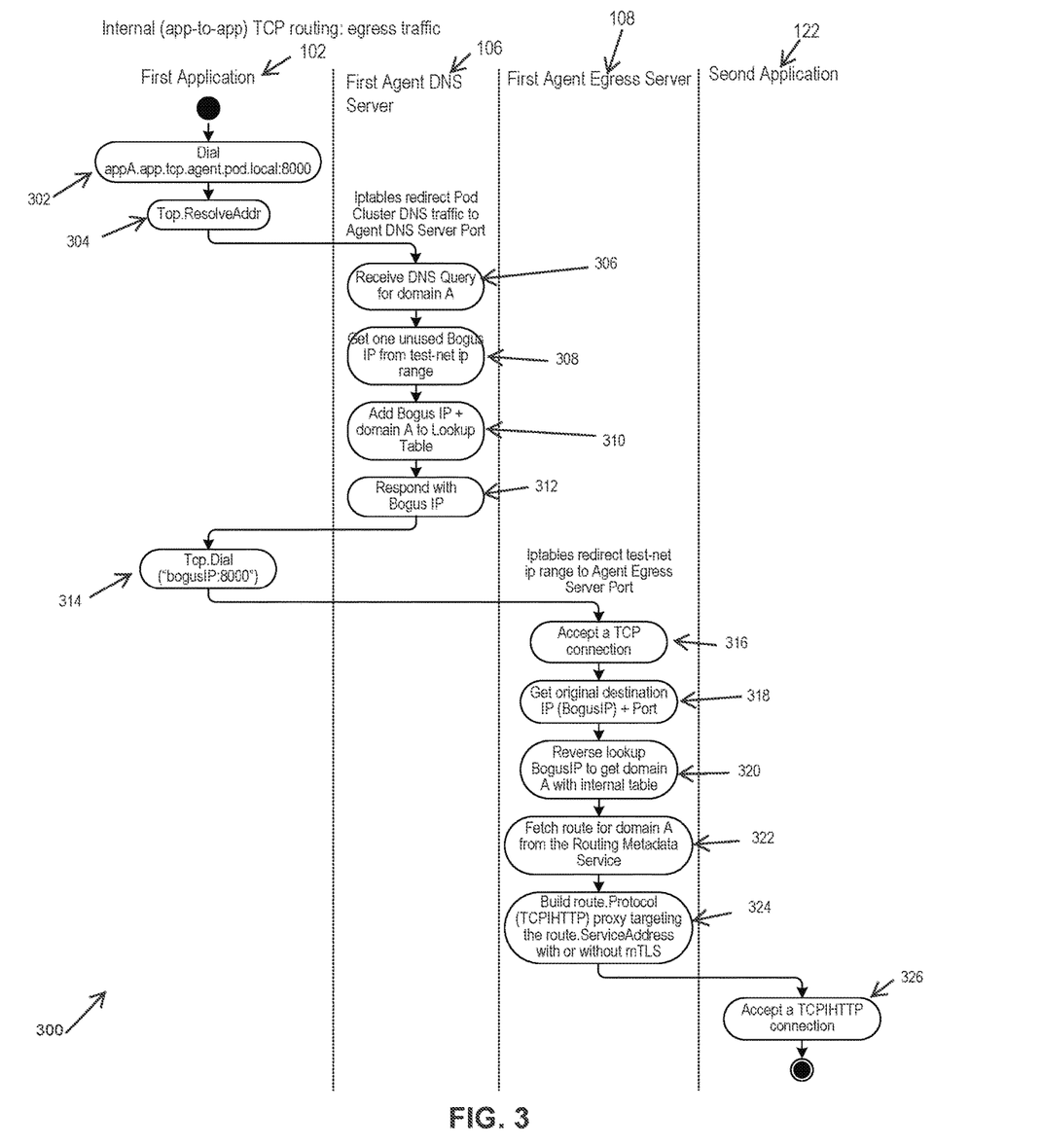
FIG. 3 is an activity diagram of the system for routing application calls, according to some embodiments.

FIG. 3 is an activity diagram 300 of the system for routing application calls, according to some embodiments. In operation 302, first application 102 can dial domain address, secondapplication.app.tcp.agent.local:8000, for second application 122. "Second application" can be the name of second application 122, and "8000" can be the port number. In this example, port number 8000 corresponds with a port of second application 122, which is configured to support TCP communication.

In operation 304, first application 102 can call tcp.ResolveAddr to query first agent DNS server 106 for the IP address corresponding to secondapplication.app.tcp.agent-.local:8000.

In operation 306, first agent DNS server 106 can receive the query for the IP address corresponding to secondapplication.app.tcp.agent.local:8000.

In operation 308, first agent DNS server 106 can identify an unused IP address from a range of IP addresses. As described above, the identified unused IP address can be a "bogus" IP address directed to documentation and are not valid public internet IP addresses.

In operation 310, first agent DNS server 106 can add the "bogus" IP address, port number, and domain address in the lookup table.

In operation 312, first agent DNS server 106 can return the "bogus" IP address to first application 102.

In operation 314, first application 102 can make a call to second application 122 by dialing ("bogus" IP address: 8000). As indicated above, the "8000" can be the port number, which indicates the desired destination port of second application 122 and the desired communications protocol (i.e., TCP).

In operation 316, first agent egress server 108 detects and intercepts the call to the second application 122. First agent egress server 110 can monitor network traffic and can be configured to detect calls to IP addresses within the range of IP addresses. Agent egress server 112 can accept the TCP connection based on the intercepted call.

In operation 318, first agent egress server 108 can identify the "bogus" IP address and port number from the intercepted call. First agent egress server 108 can determine the desired destination port of second application 122 and desired communications protocol based on the port number.

In operation 320, first agent egress server 108 can query the lookup table using the "bogus" IP address and port number to retrieve the domain address originally used by first application 102 to connect with second application 122. First agent egress server 108 can use the domain address to determine an identifier of second application 122.

In operation 322, first agent egress server 108 can use the identifier of second application 122 to query a metadata service for the route of the second application 122. The metadata service can be configured store route addresses for various applications.

In operation 324, first agent egress server 108 can build a route proxy using the retrieved route, desired destination port, and desired communications protocol. First agent egress server 108 can also build the route proxy using mTLS. First agent egress server 122 can forward the connection to second application 122 using the route proxy. The connection can include the call intercepted by first agent egress server 108. The connection can be forwarded based on the desired communications protocol and to the desired destination port. As indicated above, since the port number 8000 corresponds to a TCP endpoint at second application 122, the connection can be forwarded as TCP.

In operation 326, second application 122 can accept the connection forwarded by first agent egress server 108.

Figure 4:
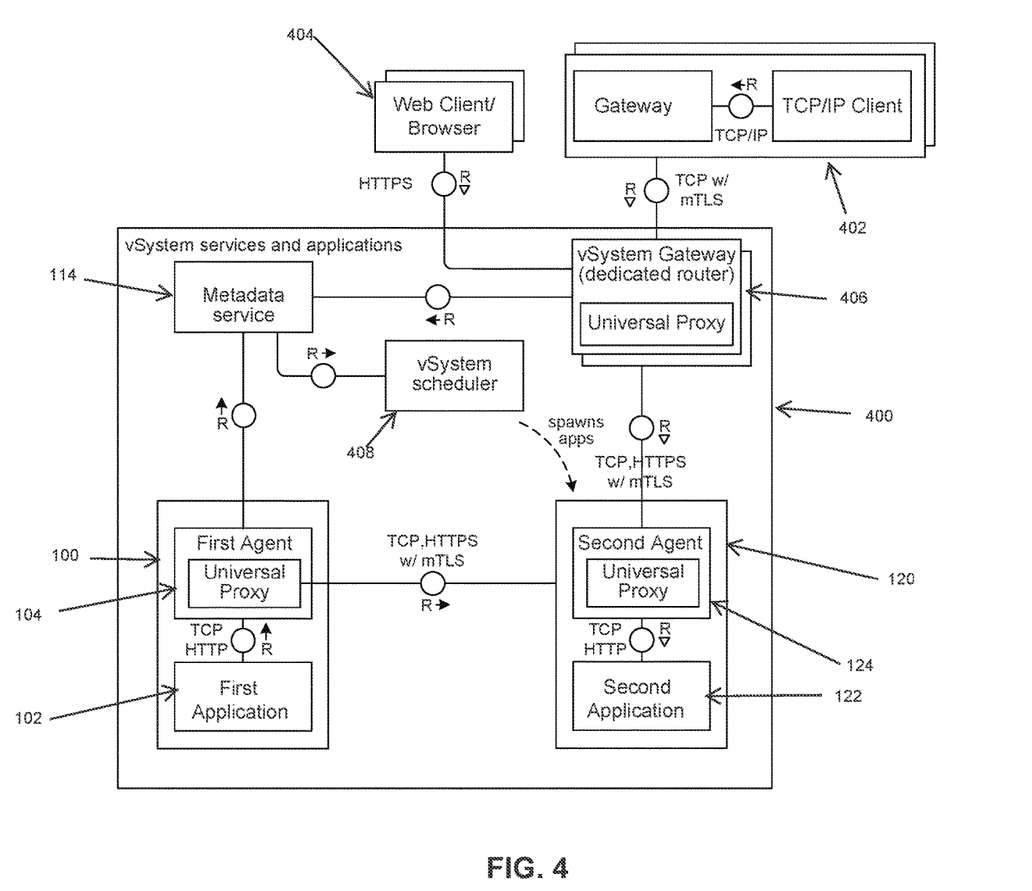
FIG. 4 is a component diagram of the routing metadata service, according to some embodiments.

FIG. 4 is a component diagram of the routing metadata service, according to some embodiments. In a given embodiment, vSystem services and applications 400 can communicate with a TCP/IP client 402 and web-client 404. TCP/IP client 402 can communicate with vSystem service and applications 400 using the TCP communication protocol. Web-client 404 can communicate with vSystem service and applications 400 using the HTTP communication protocol. For example, web-client 404 can be an internet browser.

VSystem services and applications 400 can include vSystem gateway 406, metadata service 116, vSystem scheduler 408, first sub-system 100, and second sub-system 120. VSystem gateway 408 can be a dedicated router configured to receive communication from TCP/IP client 402 and web-client 404. VSystem gateway 408 can include a universal proxy server so that the VSystem gateway 408 can receive/transmit communications of various protocols. VSystem scheduler 408 can be a service configured to spawn or deploy applications, such as first application 102 and second application 122 and assign route addresses to first application 102 and second application 122. VSystem scheduler 408 can transmit the route addresses assigned to first application 102 and second application 122 to metadata service 116. Metadata service 116 can store the route addresses for first application 102 and second application 104.

As indicated above, first sub-system 100 can include first application 102 and first agent 104. Similarly, second sub-system 120 can include second application 122 and second agent 124. First agent 104 and second agent 124 can include universal proxy servers to receive and transmit communications of various protocols.

In a given embodiment, first application 102 can transmit a connection (e.g., a call) to second application 122. As indicated above, the connection can include the domain address of second application 122. First agent 104 can receive the connection and can query metadata service 116 for the route address of second application 122 using an identifier of second application 122, as described above. Metadata service 116 can provide first agent 102 with the route address of second application 122. First agent 114 can build route proxy using the route and forward the connection to second application 122 using the route proxy. In some embodiments, first agent 114 can transmit the connection to second application 122 using mTLS. The connection can be sent as any protocol supported by second application (e.g., TCP or HTTP) as intended by first application 122.

Second agent 124 can receive the communication from first agent 114. Second agent 114 can terminate the TLS from the connection and forward an unencrypted connection to second application 122.

In a given embodiment, TCP/IP client 402 or web-client 404 can transmit a connection to second application 122. VSystem gateway 406 can receive the connection and can query metadata service 116 for the route address for second application 122. VSystem gateway 406 can query metadata service 116 to retrieve the route address for second application 122. Metadata service 116 can provide the route address for second application 122 to vSystem gateway 406. VSystem gateway 406 can build a route proxy using the route address. VSystem gateway 406 can forward the connection to second application 122 using the route proxy. The connection can be transmitted using mTLS. The connection can sent as any protocol supported by second application (e.g., TCP or HTTP) as intended by TCP/IP client 402 or web-client 404.

Second agent 124 can receive the communication from vSystem gateway 406. Second agent 114 can terminate the TLS from the connection and forward an unencrypted connection to second application 122.

Figure 5:
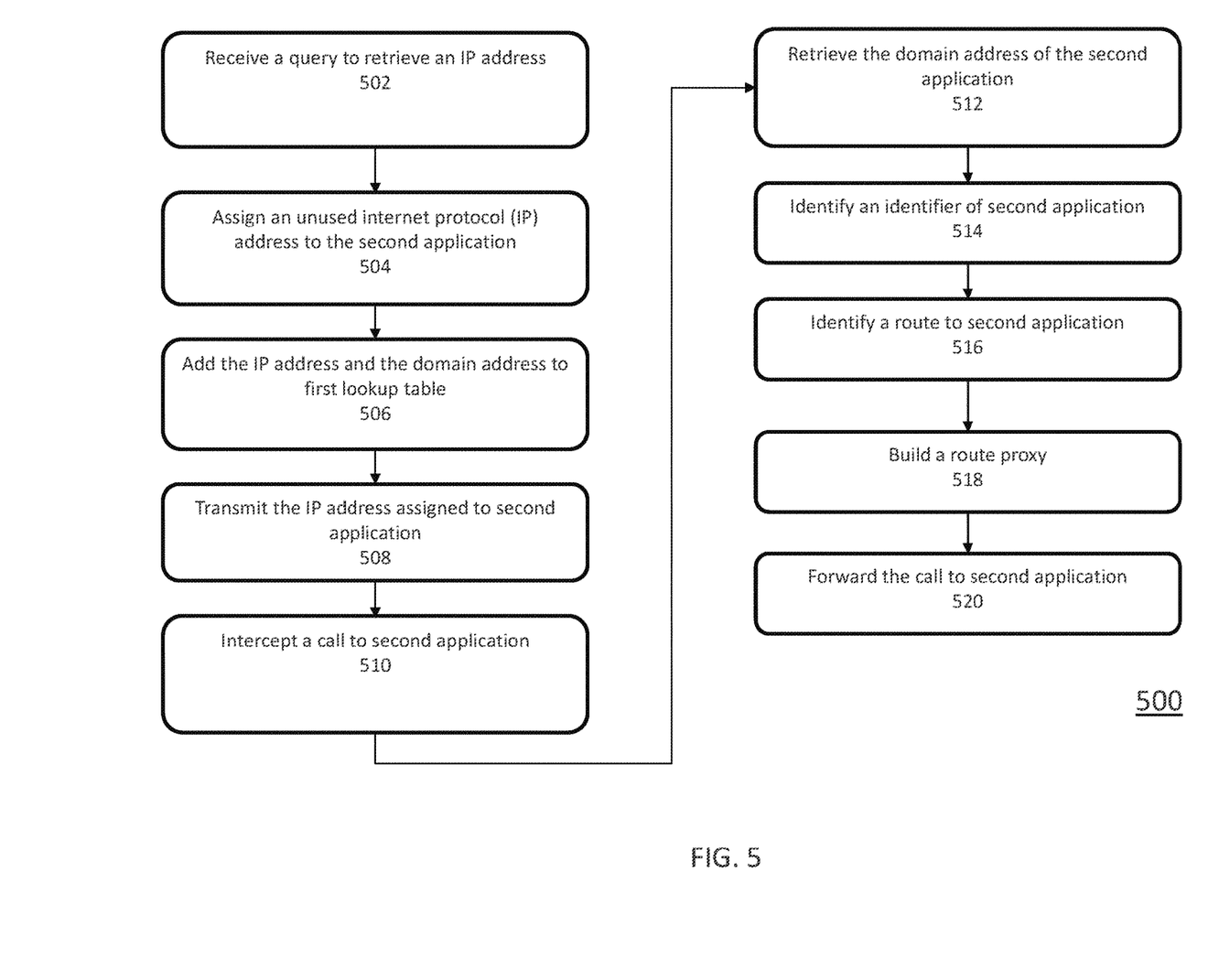
FIG. 5 is a flowchart illustrating a process for routing application calls, according to some embodiments.

FIG. 5 is a flowchart illustrating a process for routing application calls, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to that example embodiment.

In 502, first agent DNS server 106 receives, from a first application, a query to retrieve an IP address corresponding to a domain address of a second application. The query can include the domain address and port number, which indicates a desired destination port of the second application. First agent DNS server 106 can be included in a first agent 104. First agent can be an application (or sidecar) container configured to support the first application 102.

In 504, first agent DNS server 106 assigns an unused internet protocol (IP) address to the second application. The unused IP address can be from a block of IP addresses. The block of addresses can not be valid internet IP addresses. The newly assigned IP address can indicate that first application 102 is attempting to form a connection with second application 122.

In 506, first agent DNS server 106 adds the IP address assigned to the second application and the second application's domain address to first lookup table 110. First agent DNS server 106 can also add the port number to first lookup table 110. First lookup table 110 can be configured to store the IP addresses and domain addresses of various applications.

In 508, first agent DNS server 106 transmits the IP address assigned to second application 122 to first application 102.

In 510, first agent egress server 108 intercepts a call to second application 122 made by first application 102 using the IP address assigned to the second application. The call can include the IP address assigned to second application 122 and the port number. The port number can indicate the desired destination port of second application 122. Furthermore, the call can include a request to form a connection using the IP address. First agent egress server 108 can be part of first agent 104. Moreover, first agent egress server 108 can be configured to monitor traffic intended to be transmitted outside the sub-system of first application 102. More specifically, first agent egress server 108 can monitor network traffic intended for the IP addresses from the block of IP addresses.

In 512, first agent egress server 108 retrieves the second application's domain address using the IP address assigned to the second application from first lookup table 110. First agent egress server 108 can identify the IP address and port number from the intercepted call. First agent egress server 108 can also use the port number included in the intercepted call to retrieve the domain address.

In 514, first agent egress server 108 identifies an identifier of second application 122 from the domain address of second application 122. First agent egress server 108 can also determine the desired destination port of second application 122 based on the port number. The desired destination port can indicate the desired communications protocol.

In 516, first agent egress server 108 identifies a route for second application 122 using an identifier of second application 122. First agent egress server 108 can query metadata service 116 to identify the route of second application 122. Metadata service 116 stores routes of various applications. First agent egress server 108 can query a metadata service 116 using the identifier to retrieve the route. Alternatively, metadata can periodically transmit the routes of various applications to first application 102.

In 518, first agent egress server 108 builds a route proxy using the route and the port number. First agent egress server 108 can format the call based on the communications protocol corresponding to the desired destination port.

In 520, first agent egress server 108 forwards the call to second application 122 to the second application using the route proxy. The call can be forwarded to the destination port of second application 122. The call can be in a format corresponding to the communications protocol.

Figure 6:
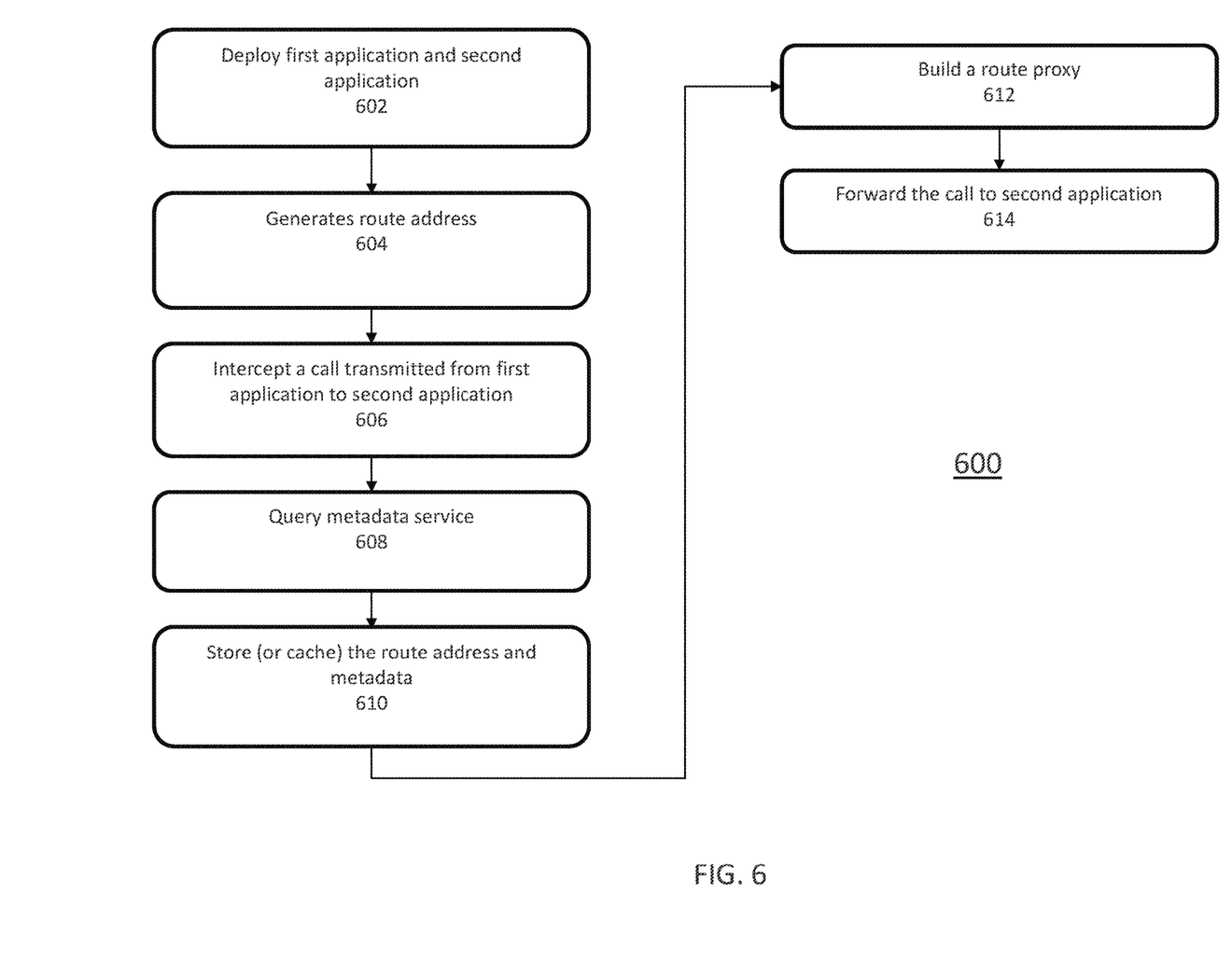
FIG. 6 is a flowchart illustrating using a metadata service to retrieve route addresses for applications, according to some embodiments.

FIG. 6 is a flowchart illustrating using a metadata service to retrieve route addresses for applications, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 6, as will be understood by a person of ordinary skill in the art.

Method 600 shall be described with reference to FIG. 1. However, method 600 is not limited to that example embodiment.

In 602, a scheduler deploys first application 102 and second application 122. The scheduler can be part of a vSystem, and first application 102 and second application 122 can be generated in the vSystem.

In 604, the scheduler generates route addresses for first application 102 and second application 122. The scheduler can provide these route addresses to metadata service 116 for storage. Metadata service 116 can be configured to store route addresses and metadata needed to communicate with various applications 122.

In 606, first agent egress server 108 intercepts a call transmitted from first application 102 to second application 122. The call can include a "bogus" IP address and a port number. First agent egress server 108 can retrieve a domain address of second application 122 from first lookup table 110 using the "bogus" IP address and port number. First agent egress server 108 can determine an identifier of second application 122 from the domain address.

In 608, first agent egress server 108 queries metadata service 116 to retrieve a route address and any metadata needed to communicate with the second application 122 using the second application's identifier. The identifier can be the name of second application 122.

In 610, first agent egress server 108 stores (or cache) the route address and metadata needed to communicate with second application in memory. First agent egress server 108 can store the route address for future use.

In 612, first agent egress server 108 builds a route proxy using the route and the port number. First agent egress server 108 can format the call based on the communications protocol corresponding to the desired destination port.

In 614, first agent egress server 108 forwards the call to second application 122 to the second application using the route proxy. The call can be forwarded to the destination port of second application 122. The call can be in a format corresponding to the communications protocol Various embodiments can be implemented, for example, using one or more computer systems, such as computer system 700 shown in FIG. 7. Computer system 700 can be used, for example, to implement methods 500 of FIG. 5, and 600 of FIG. 6. Furthermore, computer system 700 can be at least part of first sub-system 100 or second sub-system 120, as shown in FIG. 1. For example, computer system 700 route communication to various applications. Computer system 700 can be any computer capable of performing the functions described herein.

Figure 7:
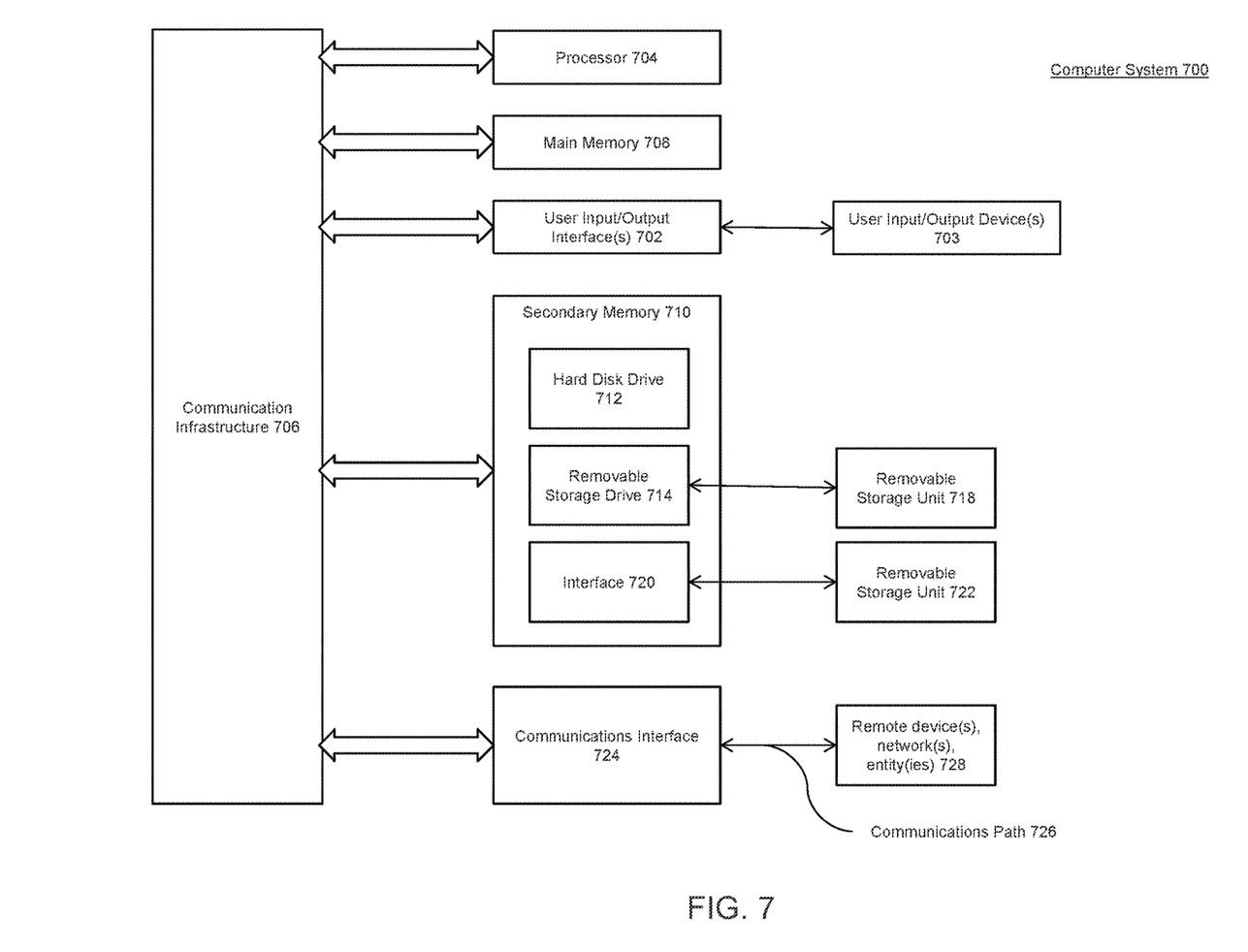
FIG. 7 is an example computer system useful for implementing various embodiments.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities, or other approaches for allowing computer programs and/or other instructions and/or data to be accessed by computer system 700. Such means, instrumentalities, or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for routing application calls, the computer-implemented method comprising:
   receiving, by one or more computing devices, from a first application, a query to retrieve an internet protocol (IP) address corresponding to a domain address of a second application;
   assigning, by the one or more computing devices, an unused IP address to the second application;
   adding, by the one or more computing devices, the IP address assigned to the second application and the domain address of the second application to a lookup table;
   intercepting, by the one or more computing devices, a call to the second application based on the IP address assigned to the second application, the call including a request to form a connection using the IP address assigned to the second application;
   retrieving, by the one or more computing devices, the domain address of the second application using the IP address assigned to the second application from the lookup table; and
   forwarding, by the one or more computing devices, the call to the second application using a route associated with the domain address.

2. The computer-implemented method of claim 1, further comprising querying, by the one or more computing devices, a metadata service to retrieve the route associated with the domain address.

3. The computer-implemented method of claim 1, further comprising:
   storing, by the one or more computing devices, in a storage device, routes for a plurality of applications including the route associated with the domain address, received from a metadata service; and
   identifying, by the one or more computing devices, the route associated with the domain address from the storage device.

4. The computer-implemented method of claim 1, wherein the first application resides on a first sub-system, and the first sub-system comprises a plurality of destination ports.

5. The computer-implemented method of claim 4, wherein each of the plurality of destination ports is configured to support a different communication protocol.

6. The computer-implemented method of claim 1, further comprising:
   identifying, by the one or more computing devices, a routing protocol based on a destination port included in the call;
   building, by the one or more computing devices, a route proxy using the route associated with the domain address and the routing protocol;
   forwarding, by the one or more computing devices, the call to the second application using the route proxy.

7. The computer-implemented method of claim 1, wherein the second application parses the call to identify relevant data included in the call to be processed by the second application.

8. A system for routing application calls, the system comprising:
   a memory; and
   a processor coupled to the memory, wherein the processor is configured to:
   receive from a first application, a query to retrieve an internet protocol (IP) address corresponding to a domain address of a second application;
   assign an unused IP address to the second application;
   add the IP address assigned to the second application and the domain address of the second application to a lookup table;
   intercept a call to the second application based on the IP address assigned to the second application, the call including a request to form a connection using the IP address assigned to the second application;

retrieve the domain address of the second application using the IP address assigned to the second application from the lookup table; and forward the call to the second application using a route associated with the domain address.

9. The system of claim 8, the processor further configured to query a metadata service to retrieve the route associated with the domain address.

10. The system of claim 8, the processor further configured to:

store in a storage device, routes for a plurality of applications including the route associated with the domain address, received from a metadata service; and identify the route associated with the domain address from the storage device.

11. The system of claim 8, wherein the first application resides on a first sub-system, and the first sub-system comprises a plurality of destination ports.

12. The system of claim 11, wherein each of the plurality of destination ports is configured to support a different communication protocol.

13. The system of claim 8, the processor further configured to:

identify a routing protocol based on a destination port included in the call;

build a route proxy using the route associated with the domain address and the routing protocol; and forward the call to the second application using the route proxy.

14. The system of claim 8, wherein the second application parses the call to identify relevant data included in the call to be processed by the second application.

15. A non-transitory computer-readable medium having instructions stored thereon, execution of which, by one or more processors of a device, cause the one or more processors to perform operations comprising:

receiving, from a first application, a query to retrieve an internet protocol (IP) address corresponding to a domain address of a second application;

assigning an unused IP address to the second application;

adding the IP address assigned to the second application and the domain address of the second application to a lookup table;

intercepting a call to the second application based on the IP address assigned to the second application, the call including a request to form a connection using the IP address assigned to the second application;

retrieving the domain address of the second application using the IP address assigned to the second application from the lookup table; and forwarding the call to the second application using a route associated with the domain address.

16. The non-transitory computer-readable medium of claim 15, wherein the operations further comprise querying a metadata service to retrieve the route associated with the domain address.

17. The non-transitory computer-readable medium of claim 15, the operations further comprising:

storing, in a storage device, routes for a plurality of applications including the route associated with the domain address, received from a metadata service; and identifying the route associated with the domain address from the storage device.

18. The non-transitory computer-readable medium of claim 15, the operations further comprising:

identifying a routing protocol based on a destination port included in the call;

building a route proxy using the route associated with the domain address and the routing protocol; and forwarding the call to the second application using the route proxy.

19. The non-transitory computer-readable medium of claim 15, wherein the first application resides on a first sub-system, and the first sub-system comprises a plurality of destination ports.

20. The non-transitory computer-readable medium of claim 19, wherein each of the plurality of destination ports is configured to support a different communication protocol.

* * * * *